Patented May 25, 1926.

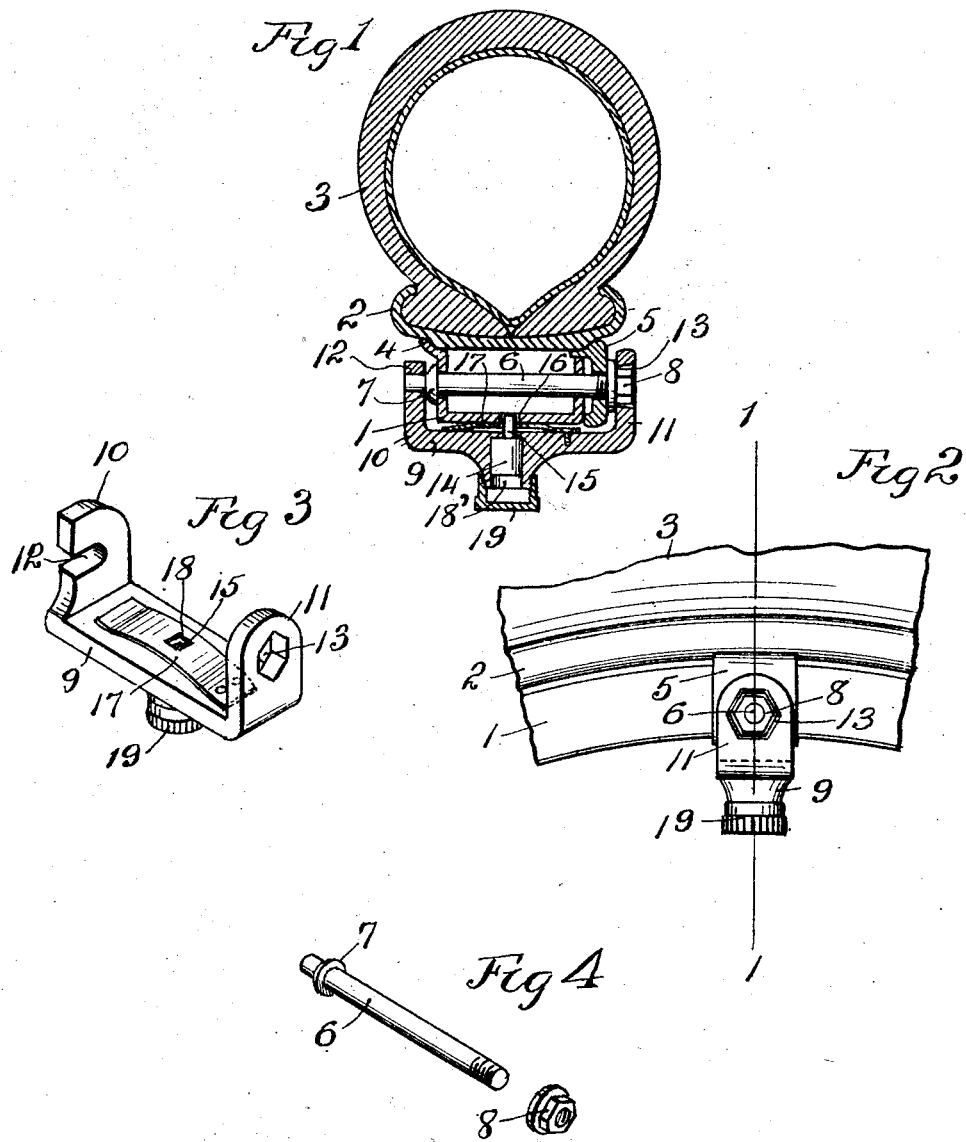

1,586,298

UNITED STATES PATENT OFFICE.

CLARENCE D. EATON, OF KANSAS CITY, MISSOURI.

WHEEL-RIM-LOCKING DEVICE.

Application filed August 5, 1925. Serial No. 48,254.

My invention relates to improvements in wheel rim locking devices.

One of the objects of my invention is to provide a novel rim locking device, which is simple, cheap to make, durable, not liable to get out of order, which may be readily and quickly applied to automobiles now in use, and which will render very difficult the felonious removal of a rim and the tire carried thereby from a wheel.

The novel features of my invention are hereinafter fully described and claimed.

In the accompanying drawing, which illustrates the preferred embodiment of my invention,—

Fig. 1 is a cross section on the line 1—1 of Fig. 2, showing my improved wheel rim locking device applied to a resilient wheel of usual type.

Fig. 2 is a side elevation of the same.

Fig. 3 is a perspective view of the yoke and some of the parts connected therewith.

Fig. 4 is a perspective view of the felly bolt and the nut shown detached from the bolt.

Similar reference characters designate similar parts in the different views.

1 designates a metal channel felly of usual type adapted to support on its periphery a rim 2 of ordinary type, having mounted thereon the usual pneumatic tire 3. The felly 1 has the usual annular flange 4 which engages the rim 2 for holding the rim from lateral movement on the felly in one direction.

5 designates an ordinary clamping member which bears against the adjacent side of the felly 1, and is adapted to engage the rim 2 to hold it from lateral movement in the other direction.

A transverse bolt 6 extends through holes provided in the felly 1 and through a hole provided in the clamping member 5. The head of the bolt comprising an annular flange 7 bears against the adjacent side of the felly 1.

On the threaded end of the bolt 6 is an ordinary nut 8 the periphery of which is other than round, such as hexagonal. The nut 8 bears against the outer side of the clamping member 5 and holds the latter engaged with the rim 2.

For preventing felonious removal of the nut 8, for the purpose of stealing the rim 2 and the tire 3 carried thereby, I provide key controlled means for engaging the bolt 6 and nut 8 adapted to hold the latter from being turned. Such means comprises a locking member which may be a yoke 9 having two arms 10 and 11 adapted, in the locking position to be disposed respectively at opposite sides of the felly 1 and to respectively engage the bolt 6 and nut 8.

The arm 10 is provided with a lateral notch 12 which is adapted to receive the reduced outer end of the head of the bolt 6. The arm 11 is provided with a perforation 13, which is other than round, and which is adapted to receive the nut 8 and to engage the polygonal periphery thereof, to hold the nut from turning. The perforation 13 flares outwardly, and the nut 8 is loosely fitted therein, so that the yoke 9 may be swung to release the arm 10 from the bolt 6, and then swung to clear the felly 1, when the yoke 9 is to be detached.

In the body of the yoke 9 intermediate of the arms 10 and 11 is provided a radial hole 18', in which is rigidly secured in any manner a lock casing 14, in which is radially movable with an ordinary key, not shown, a bolt 15, which in the locked position is adapted to enter a radial hole 16 which is provided in the felly 1 intermediate of its flanges.

When the bolt 15 is in the locking position in the hole 16, as shown in Figs. 1 and 2, the yoke 9 will have its arms 10 and 11 engaged with the bolt 6 and nut 8 respectively, and the yoke can not be moved from the locking position, until the bolt 15 is retracted with the key. The rim 2 can, therefore, not be removed unless the nut 8 is freed from the arm 11, and this can only be effected by unlocking the lock and swinging the yoke 9 laterally and then inwardly at the end having the arm 10.

To prevent the yoke from rattling against the felly, a bow spring 17 has one end rigidly fastened to the yoke 9 intermediate of the arms 10 and 11 on the side of the yoke next adjacent the felly 1. The spring bears against the felly 1 and, at its free end, against the yoke 9, thus yieldingly holding the yoke from vibration. The spring 17 has a hole 18 through which the bolt 15 may pass.

In the operation of the invention, the rim 2 having been mounted on the felly 1 and held thereon in the operative position by the bolt 6 and nut 8 engaging the felly and clamping member 5 respectively, the arm 11 is made to receive the nut 8, and the arm 10 is positioned so that the adjacent end of the bolt 6 will enter the notch 12, the loose fitting of the nut in the arm perforation 13 enabling such positioning of the yoke.

The key is then used to force the bolt 15 to the locking position in which it will enter the hole 16 in the felly 1. The spring 17 will be held compressed. The yoke can not now be released from the bolt 6 and nut 8, so that the nut can not be unscrewed to release the clamping member 5.

To prevent dirt entering the hole 18' in which the casing 14 is mounted, the yoke may be provided with an externally threaded portion around said hole on which is removably fitted a screw cap 19.

One of my locking devices on a wheel will prevent the unauthorized removal of a rim from the wheel without the use of a proper key, unless breakage of the parts, or picking of the lock is resorted to, and such consumes time, and is liable to attract attention. If desired, more than one of the locking devices may be applied to a single wheel.

I do not limit my invention to the structure shown and described, as many modifications, within the scope of the appended claims, may be made, without departing from the spirit of my invention.

What I claim is:—

1. In a wheel rim locking device, a felly adapted to support a rim, a clamping member bearing against the felly and adapted to engage and hold the rim from lateral movement in one direction on the felly, a bolt extending through the felly and clamping member and bearing against the felly, a nut on said bolt bearing against the clamping member, a locking member movable to and from a position in which it will engage the bolt and nut and hold the latter from turning, and a lock having a casing carried by the locking member and having a bolt adapted to be moved by a key to and from engagement with the felly for holding the locking member from moving from said position.

2. In a wheel rim locking device, a felly adapted to support a rim and having a hole, a clamping member bearing against the felly and adapted to engage the rim for holding the latter from movement laterally in one direction on the felly, a bolt extending through the clamping member and said felly and bearing against the latter, a nut on said bolt bearing against the clamping member, a locking member movable to and from a position in which it will engage the bolt and nut and hold the latter from turning, and means including a key operated bolt adapted to enter said hole for holding the locking member from moving from said position.

3. In a wheel rim locking device, a felly adapted to support a rim, a clamping member bearing against the felly and adapted to engage the rim for holding the latter from lateral movement in one direction on the felly, a bolt extending through the clamping member and felly and bearing against the latter, a nut on said bolt holding the clamping member against the felly, a yoke having two arms arranged to respectively engage the bolt and nut for holding the latter from turning, when the yoke is in the locking position, and key controlled means arranged to connect releasably the yoke and felly for holding the yoke from moving from said locking position.

4. In a wheel rim locking device, a felly adapted to support a rim, a clamping member engaging the felly and adapted to engage the rim to hold the latter from lateral movement in one direction on the felly, a bolt extending through the clamping member and felly and bearing against the felly, a nut on said bolt arranged to hold the clamping member against the felly, a locking member movable to and from a locking position in which it will engage said bolt and nut and hold the latter from turning, key controlled means adapted to connect the yoke and locking member for holding the latter from movement from the locking position, and a spring bearing against the locking member and felly for resisting movement of the locking member.

5. In a wheel rim locking device, a felly adapted to support a rim, a clamping member bearing against the felly and adapted to engage and hold the rim from lateral movement in one direction on the felly, a bolt extending through the clamping member and the felly and bearing against the latter, a nut other than round on said bolt and bearing against said clamping member, a yoke having two arms, one having a notch adapted to receive said bolt, the other having a perforation adapted to receive the nut and hold the latter from turning, and key controlled means adapted to connect the felly and yoke for holding the latter from moving from a locking position in which the arms will be engaged with said bolt and nut.

6. In a wheel rim locking device, a felly adapted to support a rim, a clamping member bearing against the felly and adapted to engage and hold the rim from lateral movement in one direction on the felly, a bolt extending through the clamping member and the felly and bearing against the latter, a nut other than round on said bolt bearing against said clamping member, a yoke having two arms, one having a notch for receiving said bolt, and the other having a perforation adapted to receive said nut and hold the latter from turning, and a lock having a casing carried by said yoke and having a key operated bolt adapted to engage said felly and hold the yoke with its arms respectively engaging said first named bolt and nut.

7. In a wheel rim locking device, a felly adapted to support a rim and having a hole, a clamping member bearing against the felly and adapted to engage and hold the rim from lateral movement in one direction on the felly, a bolt extending through the clamping member and felly and bearing against the latter, a nut on said bolt having a periphery other than round and bearing against said clamping member, a yoke having two arms, one having a notch adapted to receive the bolt, the other arm having a perforation adapted to receive said nut and hold the latter from turning, and a lock having a casing carried by said yoke and having a key operated bolt adapted to enter said hole in said felly and hold said yoke from moving from the locking position in which said arms will engage said bolt and nut respectively.

In testimony whereof I have signed my name to this specification.

CLARENCE D. EATON.